United States Patent [19]
Yoshida

[11] 4,377,846
[45] Mar. 22, 1983

[54] ARITHMETIC UNIT FOR GENERATING CONSTANTS IN AN ELECTRONIC COMPUTER OF THE MICROPROGRAM-CONTROLLED TYPE

[75] Inventor: Kazufumi Yoshida, Hadano, Japan
[73] Assignee: Hitachi, Ltd., Tokyo, Japan
[21] Appl. No.: 194,814
[22] Filed: Oct. 7, 1980
[30] Foreign Application Priority Data
  Oct. 8, 1979 [JP] Japan ............... 54-129637
[51] Int. Cl.$^3$ ............... G06F 9/22; G06F 9/32
[52] U.S. Cl. ............... 364/200; 364/736
[58] Field of Search ............... 364/200 MS File, 736
[56] References Cited
  U.S. PATENT DOCUMENTS 3,391,394  7/1968  Ottaway et al. ............... 364/200
  4,064,554 12/1977  Tubbs ............... 364/200
  4,124,893 11/1978  Joyce et al. ............... 364/200
  4,179,737 12/1979  Kim ............... 364/200

Primary Examiner—Jerry Smith
Attorney, Agent, or Firm—Antonelli, Terry & Wands

[57] ABSTRACT

A micro instruction is composed of an arithmetic control section for controlling arithmetic operations, a sequence control section for controlling the sequence of the execution of micro-programs and a constant selecting section for specifying the use of the sequence control section for the generation of an arithmetic constant. When the generation of an arithmetic constant is being selected, the sequence of the execution of micro-programs is uniquely determined on the basis of the current address by using the sequence control section as an arithmetic constant, irrespective of the arithmetic control section.

8 Claims, 6 Drawing Figures

ARITHMETIC UNIT FOR GENERATING CONSTANTS IN AN ELECTRONIC COMPUTER OF THE MICROPROGRAM-CONTROLLED TYPE

BACKGROUND OF THE INVENTION

This invention relates to an arithmetic unit for an electronic computer of the microprogram-controlled type, and more particularly to an arithmetic constant generating means.

In an electronic computing system, the instructions to control sub-units, such as registers, counters, adders etc., gates interconnecting the sub-units with one another, and functional units interconnecting the gates to provide proper timing signals are called the micro instructions, and the micro-programming refers to the definition of a larger function through programming such micro instructions in a synthetic manner.

Micro instructions are classified into two types: the horizontal micro instruction and the vertical one. In a horizontal micro instruction, each bit of the micro instruction corresponds directly to a control signal; while with a vertical micro instruction, numerous control signals are produced through the various combinations of the individual bits of the micro instruction.

FIG. 1 shows a schematic construction of a conventional computer using a horizontal microprogram and FIG. 2 shows a schematic construction of a conventional computer using a vertical micro program.

In FIG. 1, the control storage CS comprises a control matrix 11 and a sequence matrix 12, each matrix serving as a coder. When an instruction code 102 serving as a part of a micro instruction, produced by the sequence matrix 12, is sent through a delay circuit 8 to an address register 4, the instruction code 102 is decoded by a decoder 9 to select an address. The reading operation on the control storage CS is performed through the selective application of clock pulses CL thereto and accordingly a specified signal, i.e. a micro order specifying signal 101 serving as a part of a micro instruction, is read out from the control matrix 11. The number of the total signals 101 available from the matrix is equal to that of the micro orders used in the computer in question. The signals 101 control the operations of an arithmetic circuit 2, registers 6 of different functions, a local storage 7 etc. At the same time when the micro order specifying signal 101 is read out of the control matrix 11, an instruction code 102 is read out from the sequence matrix 12. The delivered instruction code 102 is sent through the delay circuit 8 to the address register 4 and renews the content of the address register 4 so that an address for the micro instruction to be effected on the basis of the following clock pulses CL is specified.

The horizontal (or direct-control) microprogram as shown in FIG. 1, in which one bit in the control storage CS corresponds to one micro order, is used for the computer which requires a simplified decoder logic, especially a large-capacity computer since this method can decrease the machine cycle time to a great extent.

In FIG. 2, on the other hand, a single micro instruction read out of the control storage CS to a micro instruction register 10, is divided into plural fields SFo-SFn and they are converted to different codes through combinations of exclusive micro orders.

The vertical (or coding-control type) micro-program as shown in FIG. 2 is used for a computer in which the number of the bits to be controlled needs to be decreased to decrease the cost preferentially, that is, especially for a small-capacity machine having a simple structure. According to this method, there is required additional time for decoding, which results in an increase in the processing time.

Thus, the horizontal micro-programming system is used mainly for a large-scale computer and the decoder logic used there is simplified so that high speed control is possible by increasing the wordlength of each micro instruction. On the other hand, the cost can be reduced at the sacrifice of processing speed by decreasing the wordlength.

Incidentally, there is a rather high necessity of an arithmetic constant being generated, in the firmware or the like, but only a low necessity of the same sort for a set of instructions according to the standard specification.

For this reason, control fields as a part of a micro instruction are usually used to generate such arithmetic constants.

Moreover, in the generation of the arithmetic constant in a conventional computer using the horizontal micro-program, an arithmetic constant having a large number of digits is generated in several steps.

FIG. 3 shows in block diagram a main part of a conventional arithmetic unit and FIG. 4 shows a micro-program for commanding the generation of an arithmetic constant, used in the arithmetic unit shown in FIG. 3.

For example, in the case where such a calculation as given by the following expression is performed by a conventional apparatus:

$$(UO) = RG + (012345)_{16} \qquad (1),$$

a group of micro instructions such as shown in FIG. 4 are sequentially read out from the control storage CS and set in a micro instruction register 10 in FIG. 3. In the above expression (1), (UO) indicates a specified area in a local storage 70 in FIG. 3, RG the content of one of a plurality of registers 60, and $(012345)_{16}$ an arithmetic constant in the hexadecimal notation.

The micro instruction register 10 is divided into an arithmetic control section 110 and a sequence control section 120. The respective bits of the arithmetic control section are used to compile micro order specifying signals for various controls, just as described with FIG. 1, and the sequence control section 120 produces a content to specify the next address in the control storage CS. Namely, the content of the sequence control section 120 of the micro instruction register 10 is sent to a micro instruction address generating circuit 20, which delivers a micro instruction address. After the micro instruction address has been set in a control storage address register 40, the next micro instruction is read out from the location in the control storage corresponding to the above set micro instruction address and then set in the micro instruction register 10.

Here, if the micro instruction had a long wordlength, a field for an arithmetic constant, or a constant field for short, could be independently defined, but since the computer in question has a simple constitution as mentioned before and since the control storage CS and the micro instruction register 10 cannot treat signals having long wordlengths, then the constant field 14 is formed by overlapping parts of the arithmetic control section 110 and the sequence control section 120.

By using this constant field 14, the micro instructions as shown in FIG. 4 are sequentially set in the micro instruction register 10. First, according to a micro instruction $a_1$, the content (01) of the constant field 14 is stored, through an arithmetic circuit, in the area UO in the local storage 70 and then according to a micro instruction $a_2$, the content (23) is stored in the same area UO. Finally, according to a micro instruction $a_3$, the content (45) is also stored in the same area UO. Thus, an arithmetic constant $(012345)_{16}$ is stored in the area UO of the local storage 70 according to the three micro instructions $a_1-a_3$.

Next, according to a micro instruction $a_4$, the micro order specifying signal generated from the arithmetic control section 110 causes the content of the area UO of the local storage 70 and the content of the register RG of the register group 60 to be sent to the arithmetic circuit 2. The arithmetic circuit 2 produces the sum of the contents and the sum is stored in the area UO of the local storage 70.

As described above, with the arithmetic unit shown in FIG. 3, the arithmetic circuit 2 is occupied three times to produce the constant $(012345)_{16}$ and therefore three arithmetic cycles are needed for the generation of an arithmetic constant. Therefore, whenever the micro instruction step is entered, a degradation in performance is inevitable.

Since the micro-program, unlike a usual program (set of micro instructions) directly control the operations of the sub-units, it may be regarded as a part of hardware, but it may often be caused to belong to an independent class called firmware, having an intermediate property.

It is necessary especially in firmware to generate arithmetic constants during an arithmetic operation. They may be, for example, self-evident operand addresses or self-evident operands (constants). Since the firmware is executed by replacing the function of software by a micro-program, the performance in calculation operation must necessarily be improved. In that case, however, if a time of several machine cycles is required to generate an arithmetic constant, the loss in performance is considerable.

It is of course possible to eliminate this problem by causing each micro instruction to have a wordlength long enough to produce a large arithmetic constant, but in this case the storage capacity of the control storage CS must be increased, which leads to a considerable increase in the cost.

It is also possible to prevent the cost from increasing by using most of the fields for the generation of arithmetic constants without increasing the wordlength of every micro instruction, but in this case, too, the function of the arithmetic control section 110 will be restricted or the function of the sequence control section 120, e.g. address branching, will be limited.

To eliminate such a limitation, a full cycle must be used for the generation of an arithmetic constant. This, however, leads to a degradation in performance.

SUMMARY OF THE INVENTION

The object of the present invention, which has been made to eliminate a problem incidental to the conventional arithmetic unit, is to provide an arithmetic unit which uses simple means to generate arithmetic constants and which has resort to neither increasing the wordlength of each micro instruction nor using the arithmetic execution cycle only for the generation of an arithmetic constant.

According to a first feature of the present invention, the generation of an arithmetic constant is ordered by using that portion of a micro instruction which is stored in the sequence control section, not in the arithmetic control section, and therefore a selection is made between the address obtained directly or indirectly from the sequence control section and the address equal to the current address (present address) plus unity and the selected address is used as the control storage address. Accordingly, this constant can be specified independent of the specifications of other arithmetic controls and the sequence control section can be made independent of the control storage address if it is renewed when unity is added thereto.

According to a second feature of the present invention, each arithmetic constant is generated and held before the arithmetic cycle in which the constant is needed so that an arithmetic constant can be generated by selecting a desired micro instruction in the program execution sequence.

According to a third feature of the present invention, if that portion of a micro instruction which is stored in the sequence control section of the micro instruction register, does not have a bit length long enough to be used as a desired arithmetic constant, then the portions of plural micro instructions each corresponding to the content of the sequence control section are used in combination to form an arithmetic constant.

DESCRIPTION OF THE PREFERRED EMBODIMENT

This invention will now be described by way of embodiment with the aid of the attached drawings.

Figure 5:
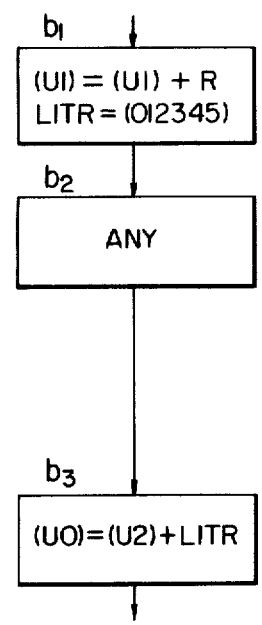
FIG. 5 shows a micro-program for ordering the generation of a constant, as an embodiment of this invention.
Figure 6:
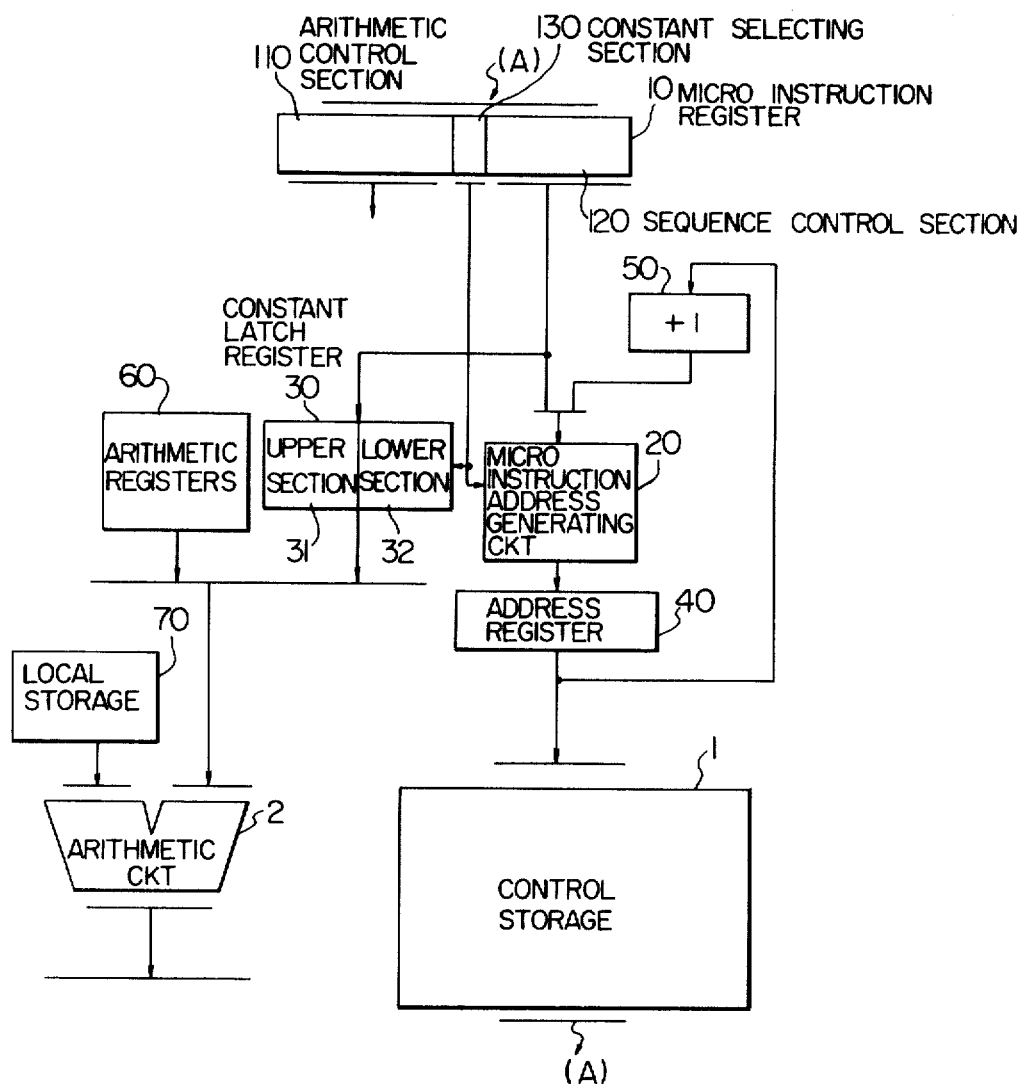
FIG. 6 schematically shows the block diagram of a main part of an arithmetic unit as an embodiment of this invention.

FIG. 5 illustrates a micro-program for ordering the generation of an arithmetic constant, as an embodiment of this invention and FIG. 6 shows in block diagram a main part of an arithmetic unit as an embodiment of this invention.

In FIG. 6, micro-programs are stored in a control storage 1 and a single micro instruction is read out from the address represented by the content of a control storage address register 40 and then stored in a micro instruction register 10.

The micro instruction register 10 and therefore the micro instruction itself that is the content of the register 10 is divided into an arithmetic control section 110, a sequence control section 120 and a constant selecting section 130. As well known, the arithmetic control section 110 controls an arithmetic circuit 2 etc. to cause a group of registers 60 and a local storage 70 to start arithmetic operations. The constant selecting section 130 is the field which indicates whether the sequence control section 120 is used to generate an arithmetic constant or not. For example, if the section 130 is '1', the section 120 is found to be under use for the generation of an arithmetic constant while if the section 130 is '0', the sequence control section 120 is to be used for sequence control. The constant selecting section 130 consists of a single bit except in a special case, and the bit lengths of individual micro instructions need not be decreased.

When the constant selecting section 130 is not indicating the generation of an arithmetic constant, the content of the sequence control section 120 is selected and sent to a micro instruction address generating circuit 20 to specify a control storage address. The thus generated address is set in the control storage address register 40 to make ready for reading the next micro instruction.

An address holding register 50 is a step register which always holds the value equal to the current content of the control storage address register 40 plus unity. While the constant selecting section 130 is indicating the generation of an arithmetic constant, the address holding register 50 is selected and the content of the register 50 is set in the micro instruction address generating circuit 20. The address generated by the circuit 20 is set in the control storage address register 40.

While the constant selecting section 130 is indicating the generation of an arithmetic constant, the sequence control section 120 is an arithmetic constant to be generated and this constant is sent to a constant latch register 30 and set therein.

The constant latch register 30 is a register for generating and holding an arithmetic constant, newly provided according to this invention. The register 30 has a capacity several times as large as the bit length of the sequence control section 120. The constant latch register 30 receives the control signal from the constant selecting section 130 and when the generation of an arithmetic constant is not ordered, the constant latch register 30 continues to hold the old value. If the bit length of an arithmetic constant to be generated is larger than that of the sequence control section 120, the constant is composed of the parts of plural micro instructions through a combining operation. In that case, since the constant latch register 30 is divided into an upper section 31 and a lower section 32, as shown in FIG. 6, then the upper section 31 is filled in the first step and the lower section 32 is filled next. In this two-step setting, the control signal from the constant selecting section 130 specifies which one of the two sections 31 and 32 is first filled, or the order of filling the two sections is previously specified in a cyclic manner.

The constant latch register 30, like other arithmetic registers 60, has its content read out selectively under the control of the arithmetic control section 110 of the micro instruction and the read content is used as an input data block to the arithmetic circuit 2. In this case, the arithmetic control section 110 specifies to read out either the full content of the constant latch register 30 at one time or the upper section 31 and the lower section 32 thereof are read out separately.

Now, the execution of an arithmetic operation represented by the expression (1) given above will be explained by taking the micro-program shown in FIG. 5 as an example.

First, according to a micro instruction $b_1$, the arithmetic control section 110 specifies the following arithmetic operation (2) which is irrespective of the above expression (1):

$$(U1) = (U1) + R \qquad (2)$$

In this expression (2), ($U1$) indicates a desired area in the local storage 70 shown in FIG. 6 and R the content of the selected one of the arithmetic registers 60. This arithmetic operation has no relation to the expression (1), to which only the constant selecting section 130 and the sequence control section 120 has a relation.

Since the constant selecting section 130 is specifying the generation of an arithmetic constant (literal register LITR), the content $(012345)_{16}$ of the sequence control section 120 is set in the constant latch register 30. By executing the micro instruction $b_1$, the address holding resistor 50 holds a content $(b_1+1)$ as the next address.

According to the micro instruction $b_1$, an arithmetic constant is set in the latch register 30 simultaneously with other ordinary arithmetic operations and therefore an arithmetic constant can be generated without using the arithmetic circuit 2 exclusively for this purpose.

Next, a micro instruction $b_2$, which is stored after the micro instruction $b_1$ in the control storage 1, is read out and executed. The micro instruction $b_2$ comprises an arithmetic control section 110 for specifying an arbitrary arithmetic operation (ANY), a constant selecting section 130 for not specifying the generation of an arithmetic constant, and a sequence control section 120 for specifying the next address.

Moreover, if all the desired arithmetic constants cannot be specified according to the micro instruction $b_1$, the constant selecting section 130 again specifies the generation of an arithmetic constant according to the next micro instruction $b_2$ and the generation of the remaining constants are specified according to the sequence control section 120.

Further, if a micro instruction $b_3$ shown in FIG. 5 is stored after the micro instruction $b_1$, the micro instruction $b_3$ is executed in place of the micro instruction $b_2$.

In each of the above cases, it is necessary to previously store the content RG of a desired one of the registers 60 in the desired area (U2) of the local storage 70.

As shown in FIG. 5, the sequence control section 120 of the micro instruction $b_2$ specifies the address of the next micro instruction $b_3$. In this case, since the constant selecting section 130 does not specify the generation of an arithmetic constant, the constant latch register (literal register LITR) 30 continues to hold the content $(012345)_{16}$.

According to the micro instruction $b_3$, the arithmetic control section 110 specifies the following arithmetic operation:

$$(U0) = (U2) + LITR \qquad (3).$$

Namely, the content $(012345)_{16}$ of the constant latch register (LITR) 30 is read out and set in the arithmetic circuit 2 and simultaneously the content RG of the desired area (U2) of the local register 70 is read out and set also in the arithmetic circuit 2. The set contents $(012345)_{16}$ and RG are added together and the sum is stored in the predetermined area (U0) of the local register.

The constant selecting section 130 and the sequence control section 120 of the micro instruction $b_3$ may be used to generate an arithmetic constant for the next arithmetic operation. Also, the sequence control section 120 may be used to perform its proper function, i.e., an addressing function, for branching to any desired address.

Figure 1:
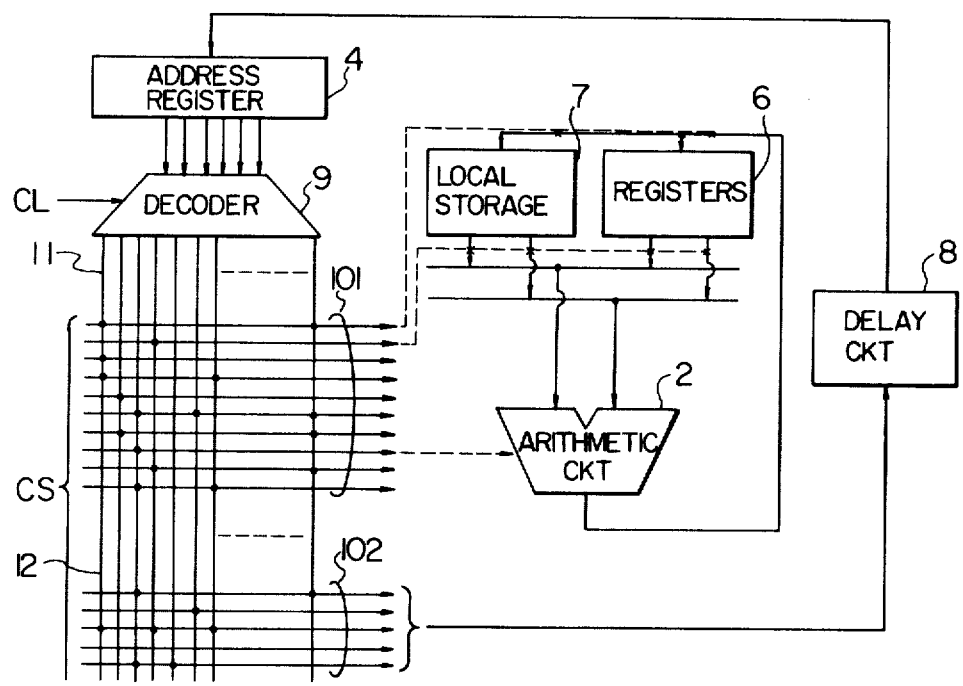
FIG. 1 schematically shows the structure of a main part of a conventional electronic computer using the horizontal micro-program.
Figure 2:
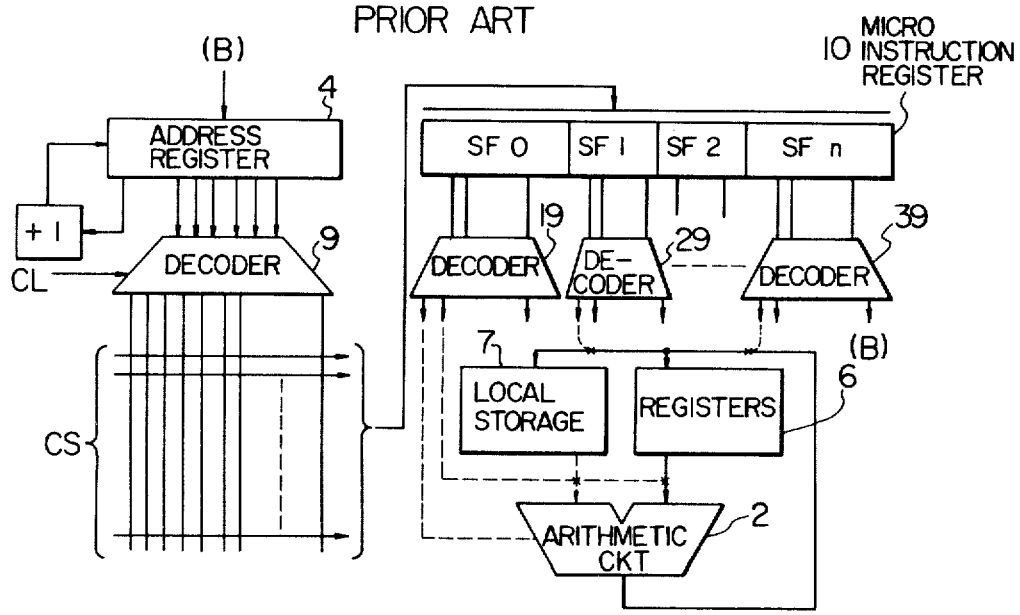
FIG. 2 schematically shows the structure of a main part of a conventional electronic computer using the vertical micro-program.
Figure 3:
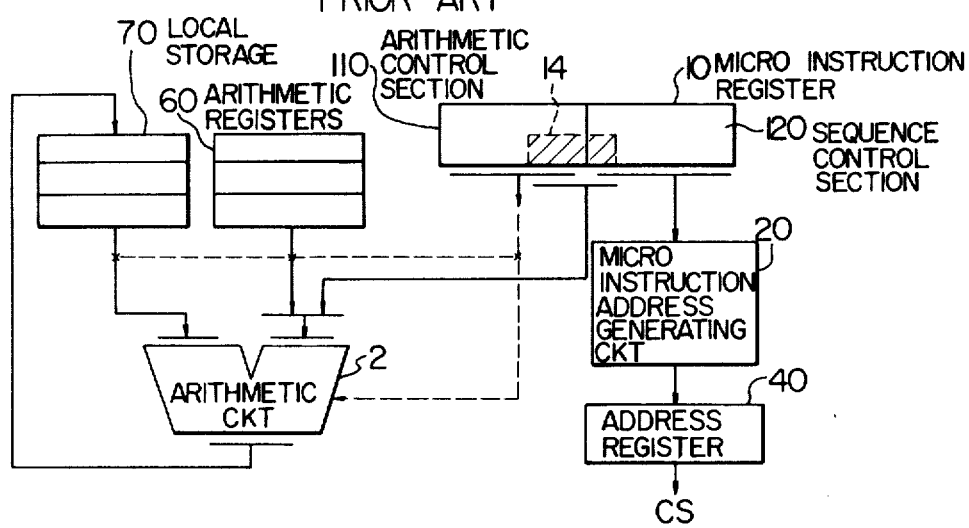
FIG. 3 schematically shows the block diagram of a main part of a conventional arithmetic unit using the horizontal micro-program.
Figure 4:
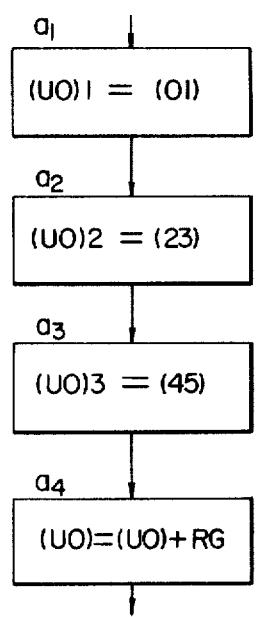
FIG. 4 shows a micro-program for ordering the generation of an arithmetic constant in the arithmetic unit shown in FIG. 3.

As apparent from the comparison of FIG. 4 with FIG. 5, whereas the conventional arithmetic unit uses three micro instructions $a_1$-$a_3$ to generate an arithmetic constant so that the arithmetic circuit 2 is occupied over three arithmetic cycles, according to this invention it is possible to generate an arithmetic constant by using only one micro instruction $b_1$ and without occupying the arithmetic circuit 2 and therefore the performance can be much improved.

In the arithmetic unit shown as an embodiment of this invention in FIG. 6, when the generation of an arithmetic constant is specified by the constant selecting section 130, the control storage address to be next executed is equal to the current address (address presently under execution) plus unity, but this invention is by no means limited to this way of forming the address to be next executed. It is only necessary to choose as the address to be next executed, any address that can be uniquely determined on the basis of the current address and accordingly the address register having the function of adding unity to its content may be replaced another suitable circuit.

As described hitherto, according to this invention, since a micro instruction is provided with a constant selecting section and since the sequence control section is effectively used for specifying the generation of an arithmetic constant, then the constant can be generated without increasing the number of the cycles of necessary arithmetic operations and the bit length of each micro instruction. Moreover, according to this invention, since the generation of an arithmetic constant can be specified, irrespective of the arithmetic control section of the same micro instruction, without occupying the arithmetic circuit exclusively, then an arithmetic constant can be previously generated and held according to any micro instruction. Further, since even a very large arithmetic constant can be generated piecewise by the use of a constant latch register, this invention can be applied to a small-scale arithmetic unit to prevent the increase in the capacity of the control storage.

I claim:

1. An arithmetic unit for use in an electronic computer of the microprogram-control type, comprising
control storage means for storing therein a micro instruction including an arithmetic control section for controlling an arithmetic operation, a sequence control section for controlling the sequence of the execution of microprograms and a constant selecting section for specifying the use of said sequence control section for the generation of an arithmetic constant;
micro instruction holding means for holding a micro instruction read out from said control storage means;
constant latch means for receiving and holding an arithmetic constant in the form of said sequence control section, when the generation of an arithmetic constant is specified by said constant selecting section of the micro instruction held by said holding means;
means for uniquely determining the sequence of the execution of microprograms on the basis of the current address when the generation of an arithmetic constant is specified by said constant selecting section; and
arithmetic calculator means for arithmetically treating the arithmetic constant held in said constant latch means under control of said arithmetic control section of the micro instruction held by said holding means.

2. An arithmetic unit for use in an electronic computer of the microprogram-control type, comprising
control storage means for storing therein a micro instruction including an arithmetic control section for controlling an arithmetic operation, a sequence control section for controlling the sequence of the execution of microprograms and a constant selecting section for specifying the use of said sequence control section for the generation of an arithmetic constant;
micro instruction register means for holding a micro instruction read out from said control storage means;
micro instruction address generating means for selecting said sequence control section to generate the address of a micro instruction to be next read out when said constant selecting section is not specified;
means for uniquely determining the address of a micro instruction to be next read out on the basis of the current address when the constant selecting section of a micro instruction is specified;
constant latch means for reading out and latching the sequence control section of a micro instruction when the constant selecting section of said micro instruction is specified; and
arithmetic calculator means for arithmetically treating the arithmetic constant held in said constant latch means.

3. An arithmetic unit as claimed in claim 1 or 2, wherein said constant selecting section of said micro instruction is stored in a storage provided separate from said control storage.

4. An arithmetic unit as claimed in claim 1 or 2, wherein said means for uniquely determining the sequence of the execution of micro-programs on the basis of the current address is a circuit for adding unity to said current address.

5. An arithmetic unit as claimed in claim 1 or 2, wherein said constant latch means has a capacity several times as large as the bit length of said sequence control section of said micro instruction.

6. An arithmetic unit as claimed in claim 1 or 2, wherein said constant latch means is divided into an upper section and a lower section which are separately filled with constants.

7. An arithmetic unit as claimed in claim 6, wherein said constant is selectively set in either of said upper and lower sections by said constant selecting section of said micro instruction.

8. An arithmetic unit as claimed in claim 6, wherein said constant is sequentially set in said upper and lower sections.

* * * * *